United States Patent
Schuster et al.

[11] Patent Number: 6,012,178
[45] Date of Patent: Jan. 11, 2000

[54] ANTIBALLISTIC PROTECTIVE HELMET

[75] Inventors: Dieter H. P. Schuster, Sassenburg; Achim G. Fels, Wuppertal, both of Germany

[73] Assignee: Akzo Nobel NV, Arnhem, Netherlands

[21] Appl. No.: 08/947,403

[22] Filed: Oct. 8, 1997

Related U.S. Application Data

[63] Continuation-in-part of application No. PCT/EP96/01476, Apr. 4, 1996.

[51] Int. Cl.⁷ .................................................. A42B 3/00
[52] U.S. Cl. .................................................. 2/412; 2/2.5
[58] Field of Search ................................ 2/2.5, 410, 411, 2/412; 428/911

[56] References Cited

U.S. PATENT DOCUMENTS

| | | | |
|---|---|---|---|
| 2,123,275 | 7/1938 | Dym | 2/412 |
| 2,879,654 | 3/1959 | Evans | 66/176 |
| 4,343,047 | 8/1982 | Lazowski et al. | |
| 4,953,234 | 9/1990 | Li et al. | 2/412 |
| 5,018,220 | 5/1991 | Lane et al. | |
| 5,075,904 | 12/1991 | Shirasaki et al. | 2/412 |
| 5,395,683 | 3/1995 | Bledsoe et al. | 428/253 |
| 5,422,153 | 6/1995 | Miyamoto | 428/95 |
| 5,461,885 | 10/1995 | Yokoyama et al. | 66/170 |
| 5,857,215 | 1/1999 | Fergason et al. | 2/8 |

FOREIGN PATENT DOCUMENTS

| | | |
|---|---|---|
| 2 697 626 A1 | 5/1994 | France . |
| 38 06 204 A1 | 9/1989 | Germany . |
| WO 89/01123 | 2/1989 | WIPO . |

OTHER PUBLICATIONS

DuPont Magazine, No. 1, pp. 10–13, 1988, "Caps Knitted From Kelvar".

*Primary Examiner*—Michael A. Neas
*Attorney, Agent, or Firm*—Oliff & Berridge, PLC

[57] ABSTRACT

A helmet, in particular an antiballistic helmet, containing protective textile fabric layers made from antiballistic fibers including aramide fibers, polyethylene fibers spun by the gel spinning process, glass fibers, metal fibers, or blends thereof. Aramide fibers are preferred. The textile fabric layers arranged on the side away from the wearer are made of multiaxial knitted fabric, and the textile fabric layers on the side toward the wearer are made of woven fabric. The layers of multiaxial knitted fabric preferably comprise 60–80% of all reinforcement layers.

11 Claims, 1 Drawing Sheet

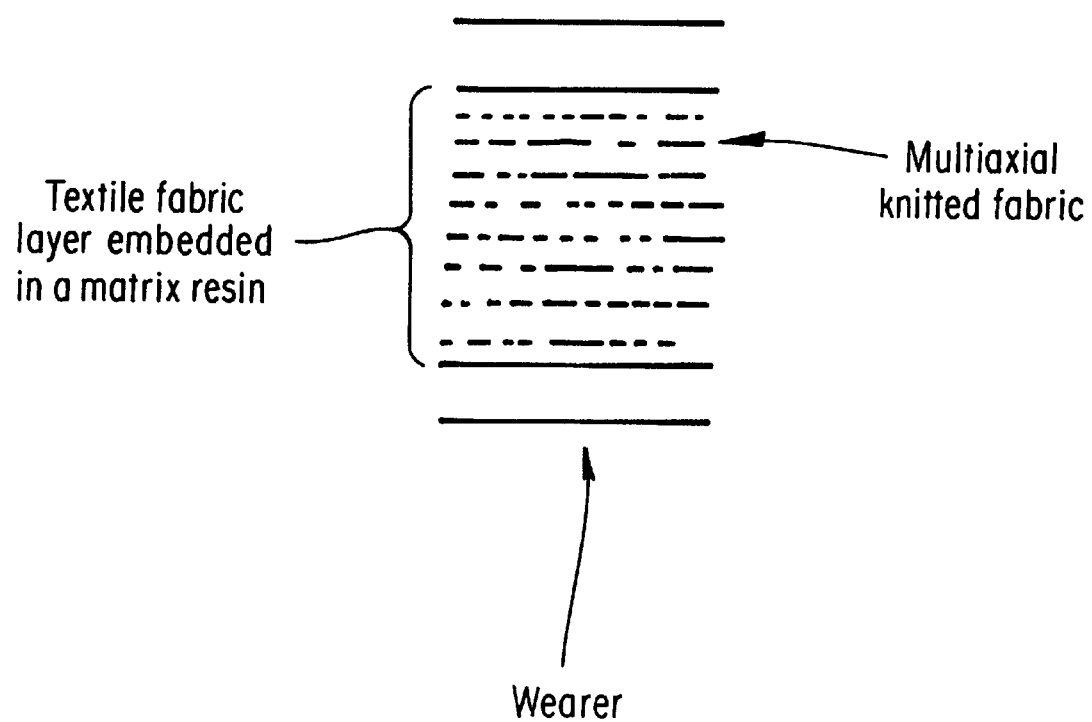
FIGURE

6,012,178

ANTIBALLISTIC PROTECTIVE HELMET

This is a Continuation-in-Part of International PCT Application No. PCT/EP96/01476, filed Apr. 4, 1996.

BACKGROUND OF THE INVENTION

1. Field of the Invention

The invention relates to a helmet, in particular an antiballistic protective helmet, consisting of a plurality of textile fabric layers embedded in a matrix and joined to one another via this matrix.

2. Description of Related Art

Helmets for military and police forces are normally antiballistic helmets, i.e., these helmets have a retarding effect on bullets and fragments, thus protecting the helmet wearer from head injuries due to projectile impact.

The protective layers of such helmets usually comprise woven fabrics made from antiballistic fibers, such as aramide fibers. Helmets containing 15 layers of aramide fabric, impregnated with phenolic resins and pressed together after being cut to a shape appropriate for helmet manufacture, are encountered very frequently as antiballistic head protection.

Normally, the protective layers of such helmets are woven fabrics, but the use of knitted fabrics has also been proposed in this case. For example, in DE-A 38 06 204 "woven and knitted fabrics with open knit structure" are mentioned for the manufacture of helmets. Likewise, U.S. Pat. No. 4,343,047 mentions knitted or woven textile fabrics for helmet manufacture.

Finally, in an article in a magazine of a manufacturer of aramide fibers (Du Pont Magazine, 1988, No. 1, pp. 10–13), "caps knitted from Kevlar" are cited as precursors for helmets (Kevlar is a trademark for an aratide fiber of this manufacturer).

All these publications see the knitted fabric as an alternative to wosvesh fabric, i.e., the teaching can be derived from these publications that the reinforcement layers ,of an antiballistic helmet are to be made from either woven or knitted fabric. The possibility of using a combination of woven and knitted fabric in a helmet is not mentioned, nor can it be inferred from these documents what type of knitted fabric is considered best uited for use in a helmet.

Advancing antiballistic protective clothing, including helmets, with the aim of improving the protective action against the impact of projectiles, fragments, etc., is a continuing task for those involved in developing such clothing, since each step forward preserves human life and protects against injuries. This has prom ted the task of further developing the protective action of antiballistic helmets.

SUMMARY OF THE INVENTION

Surprisingly, it has been found that this succeeds particularly well if the outer protective layers of the helmet, i.e., the textile-fabric protective layers on the side away from the wearer and thus th side initially exposed to bombardment, are formed from multiaxial knitted fabric made from antiballistic fibers.

BRIEF DESCRIPTION OF THE DRAWINGS

FIG. 1 is a cross-section of the helmet illustrating the textile fabric layers, including the multiaxial knitted fabric, embedded in a matrix resin.

DETAILED DESCRIPTION OF PREFERRED EMBODIMENTS

Textile fabrics are understood to comprise all fabrics made from fiber materials such as woven fabrics, knitted fabrics, nonwoven fabrics, thread composites, etc. Of particular importance for the helmet of he invention are knitted and woven fabrics.

Antiballistic fibers comprise all fiber materials that, in the form of textile fabrics, stop or significantly retard smaller objects moving at high speed, such as projectiles, fragments, etc.

Examples of antiballistic fibers are aramide fibers, polyethylene fibers spun using the gel spinning process, glass fibers, and metal fibers. Aramide fibers are preferred for making the helmet of the invention.

Aramide fibers, also called aromatic polyamide fibers, are generally well known for the manufacture of protective clothing. They are commercially available under names such as Twaron, for example.

The aramide fibers can be present in the muitiaxial knitted fabric and woven fabric either alone or in blends with other fibers. In the interest of good antiballistic effectiveness, it is preferred when using blends to blend aramide fibers with other antiballistic fibers.

The yarns to be used for manufacturing multiaxial knitted fabrics or woven fabrics can be filament or spun-fiber yarns. Due to the strength attainable with filament yarns, they are preferred. There are no restrictions with respect to the testers of the yarns to be used, which can be between 500 and 4,000 dtex, for example.

Multiaxial knitted fabrics are thread composites with a plurality of axes having at least two threads systems and joined with each other in a knitting process by a loop forming thread or a stitching warp. The multiaxial knitted fabrics are usually considered to be knitted fabrics. However, the structure is on the border between knitted fabric and thread composite. The multiaxial knitted fabric is therefore in part also referred to as a knitted multiaxial thread composite.

In principle it is also possible to use monoaxial structures, such as a normal warp knitted fabric, to manufacture the helmet of the invention. Multiaxial structures have proven better suited, however.

In the manufacture of the multiaxial knitted fabric, up to eight thread systems can be used in the machines known in the art. To make the helmet of the invention, a multiaxial knitted fabric with three to four thread systems is preferred. However, the invention is not limited to a specific type of multiaxial knitted fabric or to a specific number of thread systems; rather, it includes all variations of this class of materials.

In addition to the possible variations in the number of thread systems, a multiaxial knitted fabric offers an additional possibility to configure the arrangement of the systems, which is characterized by specification of an angle. The baseline is 0°, which forms the longitudinal axis of the fabric in the direction of production. This 0° line, therefore, is understood to be the axis through the center of the web equidistant from the two edges.

The arrangement of the other thread systems is given in angles relative to this longitudinal axis, or 0° line, where the thread systems to the right of the 0° line, as viewed in the fabric direction of travel, are normally designated by positive angles and those situated to the left by negative angles. Angles between 30° and 60° are possible. Additional thread systems can run perpendicular to the longitudinal axis and thus form an angle of 90°, by which they are designated.

The reinforcement of the thread composites produced in this manner is effected by a so-called knitting thread, which usually runs along the 0° axis. If, during manufacture of the multiaxial knitted fabrics, blends of antiballistic and non-antiballistic fibers are used, it is practical to employ the non-antiballistic fiber material for the knitting thread and preferably antiballistic fibers for the other thread systems.

The manufacture of the multiaxial fabric is performed on machines well known in the textile art, which are usually referred to as warp knitting machines with multiaxial weft-insertion systems.

The weight per unit area of the multiaxial knitted fabric should be between 200 and 600 g/m$^2$, a range of 300 to 500 g/m$^2$ being preferred.

The multiaxial knitted fabric is used for layers in the outer portion of the helmet, i.e. on the side facing away from the wearer. In these layers, the advantages of the multiaxial knitted fabric are most pronounced, as will be demonstrated in the embodiment examples.

For example, a helmet comprises 15 layers of a textile fabric made from antiballistic fibers. Of these layers, from outside to inside, the layers 1–10 or 1–12, for example, can be made from multiaxial knitted fabric and layers 11–15 or 13–15 from woven fabric. Both textile fabrics are made from antiballistic fibers, such as aramide fibers. The overall percentage of multiaxial knitted fabric in the reinforcement layers is 50–90% by weight, preferably 60–80% by weight.

It is also possible to make the helmet with portions less than 50%, with respect to all reinforcement layers, but better results have been obtained if the weight percentage of the multiaxial knitted fabric layers exceeds that of the woven fabric layers.

The woven fabric layers as well as the multiaxial knitted fabric layers are treated with a polymer that forms the matrix in the helmet. For example, this can be a phenolic resin. The amount of matrix material applied is normally 10 to 30%, preferably 10 to 20%, with respect to the dry weight of the textile fabric before treatment. For example, a phenolic resin application of 55 g/m$^2$ can be made to a multiaxial knitted fabric with a weight per unit area of 410 g/m$^2$, corresponding to an applied quantity of 13.4%.

In addition to phenolic resin, other polymers can be used as matrix material for antiballistic helmets. A large number of polymers in the duromer, elastomer, and thermoplastic categories are suitable. Example of usable products are vinyl esters, epoxy resins, acrylic resins, unsaturated polyesters, and alkyd resins. Because they are well suited for antiballistic articles and are also nonflammable, phenolic resins are preferred.

As will be shown in the embodiment examples, the positive effect of the multiaxial knitted fabric is surprisingly pronounced when this fabric is used in combination with a conventional woven fabric in the helmet, i.e., when the outer layers of the helmet comprise multiaxial knitted fabric and the inner layers woven fabric. The antiballistic properties are significantly better in this combination than with helmets employing solely multiaxial knitted fabric or solely woven fabric, in both cases made from antiballistic fibers.

The arrangement of the invention of the textile fabric layers embedded in a matrix and joined with each other via this matrix exhibits particularly good antiballistic effectiveness under the bombardment of helmets by fragments. In addition to helmets, however, other antiballistic materials such as vehicle armor, projectile-inhibiting movable barriers, etc., can be constructed in a similar manner, whereby the multiaxial knitted fabric in each case is placed on the side which is expected to receive the projectiles or fragments.

Up to now, there has not been an adequate explanation for the quite surprising antiballistic action of the helmet of the invention. One possible reason could be that during bombardment of a helmet containing multiaxial knitted fabric in the outer layers, the deformation waves that transport the energy received by the textile fabric can propagate particularly undisturbed due to the orientation of the thread layers. For a woven fabric, this is not possible due to its construction resulting from the mutual enlacing of the thread systems.

As will be shown in more detail in the embodiment examples, a significant improvement can be attained with the helmet of the invention compared to conventional helmets, thus making an important contribution to the increased safety of the wearers of such helmets.

EMBODIMENT EXAMPLES

Embodiment Example 1

This example describes the manufacture of the woven fabrics used in the trials. In this case, an aramide-fiber filament yarn with a titer of 3,360 dtex was woven into fabric in plain weave with a thread count of 6.2/cm each in warp and weft. The weight per unit area of the resulting fabric was 412 g/m$^2$.

This fabric was impregnated with a phensolic resin. The resin application was 12%, i.e., the weight per unit area of the impregnated woven fabric after drying was 461 g/m$^2$.

Embodiment Example 2

This example describes the manufacture of the multiaxial knitted fabric. On a warp knitting machine with multiaxial weft-insertion system, known as System Liba, aramide-fiber filament yarn with a titer of 3,360 dtex was processed into a multiaxial knitted fabric. Three thread systems were used, at angles of +45°, −45°, and 90°. All three systems and the knitting thread were made of the same yarn. The weight per unit area of the resulting fabric was 409 g/m$^2$.

The resulting multiaxial knitted fabric was impregnated with a phenolic resin. The resin application was 12%, i.e., the weight per unit area of the impregnated multiaxial knitted fabric after drying was 458 g/m$^2$.

Embodiment Example 3

15 layers of multiaxial knitted fabric as produced in embodiment example 2 were processed into a helmet using the method described in embodiment example 4.

This helmet was subjected to fragment bombardment in accordance with STANAG 2920. The bombardment used 1.1 g fragments. The resulting V50 value was 675 m/sec.

Comparison of the results of this example with those of embodiment examples 4–6 and comparative example 1 shows that a helmet produced from a combination of woven and multiaxial knitted fabrics according to examples 4–6 has not only a significantly better antiballistic action than one made solely from woven fabric, but also a better antiballistic action than one made solely from multiaxial knitted fabric.

Embodiment Example 4

The woven fabric from embodiment example 1 and the multiaxial knitted fabric from embodiment example 2 were processed together into a helmet. Cutouts suitable for helmet construction were made from 11 layers of the multiaxial knitted fabric and 4 layers of the woven fabric. For each layer, a so-called rose pattern was prepared. This is a form based on the helmet shape with a round or oval middle section and multiple side sections, for example with an approximate trapezoid shape.

The individual rose patterns are inserted in the helmet mold such that the raw edges of the side sections are not directly superimposed but rather the side section of the upper layer slightly covers the raw edge of the layer underneath it and thus overlaps the adjacent cutout. The individual layers are then pressed together, whereby the polymer applied to the textile fabrics forms the matrix. This method for making antiballistic helmets is generally well known in the helmet industry.

The arrangement of the individual layers was such that the helmet contained, from the outside to inside, 11 layers of multiaxial knitted fabric as produced in embodiment examples 2 and 5 woven-fabric layers as produced in embodiment example 1.

This helmet was subjected to fragment bombardment in accordance with STANAG 2920. The bombardment used 1.1 g fragments. The resulting V50 value was 720 m/sec. This value means that the penetration probability is 50% at the given bombardment speed.

Embodiment Example 5

Embodiment example 4 was repeated using 10 layers of the multiaxial knitted fabric as produced in embodiment example 2 and 6 woven-fabric layers as produced in embodiment example 1. The helmet, manufactured as described for embodiment example 4, therefore had, from the outside to inside, 10 layers of multiaxial knitted fabric and 5 layers of woven fabric.

This helmet was subjected to fragment bombardment in accordance with STANAG 2920. The bombardment used 1.1 g fragments. The resulting V50 value was 710 m/sec.

Embodiment Example 6

Embodiment example 4 was repeated using 12 layers of the multiaxial knitted fabric as produced in embodiment examples 2 and 4 woven-fabric layers as produced in embodiment example 1. The helmet, manufactured as described for embodiment example 4, therefore had, from the outside to inside, 12 layers of multiaxial knitted fabric and 3 layers of woven fabric.

This helmet was subjected to fragment bombardment in accordance with STANAG 2920. The bombardment used 1.1 g fragments. The resulting V50 value was 710 m/sec.

Comparative Example 1

Using the method described in embodiment example 4, a helmet was produced with 15 layers of a woven fabric made as described in embodiment example 1.

This helmet was subjected to fragment bombardment in accordance with STANAG 2920. The bombardment used 1.1 g fragments. The resulting V50 value was 640 m/sec.

Comparison of the results of this example with those of embodiment examples 4–6 shows that a helmet constructed in accordance with examples 4–6 from a combination of woven and multiaxial knitted fabrics has significantly better antiballistic effectiveness than one made solely from woven fabric.

Comparative Example 2

An aramide-fiber filament yarn with a titer of 3 360 dtex was processed on a knitting machine to a knitted fabric with a weight per unit area of 458 g/m$^2$. Subsequently, the fabric was impregnated with phenolic resin. After this treatment and subsequent drying, the knitted fabric had a weight per unit area of 513 g/m$^2$.

From a total of 13 layers of the knitted fabric, a helmet was produced using the method described for embodiment example 3. The number of layers was reduced compared to that in comparative example 1 and embodiment examples 3 and 4, since the use of 15 layers would have resulted in an excessive total weight and comparison would not have been possible.

The resulting helmet was subjected to fragment bombardment in accordance with STANAG 2920. The bombardment used 1.1 g fragments. The resulting V50 value was 465 m/sec.

Comparative Example 3

An aramide-fiber filament yarn with a titer of 3 360 dtex was processed on a warp knitting machine to a warp knitted fabric with monoaxial structure and a weight per unit area of 462 g/m$^2$. Subsequently, the fabric was impregnated with phenolic resin. After this treatment and subsequent drying, the fabric had a weight per unit area of 517 g/m$^2$.

From a total of 13 layers of this warp knitted fabric, a helmet was produced using the method described in embodiment example 4. As in comparative example 2, the number of layers was reduced compared to that in comparative example 1 and embodiment examples 3 and 4, since the use of 15 layers would have resulted in an excessive total weight.

The resulting helmet was subjected to fragment bombardment in accordance with STANAG 2920. The bombardment used 1.1 g fragments. The resulting V50 value was 630 m/sec.

Comparative examples 2 and 3 show that the results with other types of knitted fabrics, as shown here with a knitted or warp knitted fabric, cannot approach the good results obtained with multiaxial knitted fabric (embodiment example 3).

The results obtained in the embodiment and comparative examples are summarized in the following table:

|  | Helmet layers |  | V50 m/sec |
|---|---|---|---|
| Embod. example 3 | 15 | MA | 675 |
| Embod. example 4 | 11 | MA+ 4 W | 720 |
| Embod. example 5 | 10 | MA+ 5 W | 710 |
| Embod. example 6 | 12 | MA+ 3 W | 710 |
| Comp. example 1 | 15 | W | 640 |
| Comp. example 2 | 13 | K | 465 |
| Comp. example 3 | 13 | WK | 630 |

Key: MA = multiaxial knitted fabric as produced in embodiment example 2, W = woven fabric as produced in embodiment example 1, K = knitted fabric as described in comparative example 2, WK = warp knitted fabric as described in comparative example 3.

What is claimed is:

1. Helmet comprising a plurality of textile fabric layers embedded in a matrix material and joined together via the matrix material, wherein at least one of the textile fabric layers comprise multiaxial knitted fabric comprised of antiballistic fibers.

2. Helmet in accordance with claim 1, wherein at least one of the textile fabric layers on a side away from a wearer of the helmet comprise the multiaxial knitted fabric.

3. Helmet in accordance with claim 1, wherein at least one of the textile fabric layers on a side toward a wearer comprise woven fabric comprised of antiballistic fibers.

4. Helmet in accordance with claim 1, wherein the at least one textile fabric layers of multiaxial knitted fabric comprise 50–90% by weight of all textile fabric layers.

5. Helmet in accordance with claim 1, wherein the at least one textile fabric layers of multiaxial knitted fabric comprise 60–80% by weight of all textile fabric layers.

6. Helmet in accordance with claim 1, wherein the antiballistic fibers are aramide fibers, polyethylene fibers spun by the gel spinning process, glass fibers, metal fibers, or blends thereof.

7. Helmet in accordance with claim 1, wherein the antiballistic fibers are aramide fibers.

8. Helmet in accordance with claim 1, wherein the helmet is an antiballistic protective helmet.

9. Helmet in accordance with claim 1, wherein the matrix material is a phenolic resin, a vinyl ester, an epoxy resin, an acrylic resin, an unsaturated polyester, or an alkyd resin.

10. Helmet in accordance with claim 1, wherein the matrix material is a phenolic resin.

11. Helmet comprising a plurality of textile fabric layers embedded in a matrix material and joined together via the matrix material, wherein at least one of the textile fabric layers located on a side of the helmet away from a wearer of the helmet comprise multiaxial knitted fabric comprised of antiballistic fibers and wherein at least one of the textile fabric layers on a side of the helmet toward a wearer of the helmet comprise woven fabric comprised of antiballistic fibers.

* * * * *

UNITED STATES PATENT AND TRADEMARK OFFICE
CERTIFICATE OF CORRECTION

PATENT NO. : 6,012,178
DATED : January 11, 2000
INVENTOR(S) : Dieter H. P. SCHUSTER and Achim G. FELS It is certified that error appears in the above-identified patent and that said Letters Patent is hereby corrected as shown below:

Column 1, line 33, "aratide" should be "aramide".

Column 1, line 36, "wosvesh" should be "woven".

Column 1, line 42, "uited" should be "suited".

Column 1, line 48, "prom ted" should be "promoted".

Column 1, line 55, "th" should be "the".

Column 2, line 2, "he" should be "the".

Column 2, line 17, "muitiaxial" should be "multiaxial".

Column 2, line 29, "threads" should be "thread".

Column 4, line 26, "phensolic" should be "phenolic".

Signed and Sealed this

Seventeenth Day of April, 2001

*Attest:*

NICHOLAS P. GODICI

*Attesting Officer*   *Acting Director of the United States Patent and Trademark Office*